Oct. 18, 1966  F. R. REID  3,279,927
PACKER
Filed Sept. 23, 1960  5 Sheets-Sheet 2

INVENTOR
FRANCIS R. REID
BY
Williamson & Palmatier
ATTORNEYS

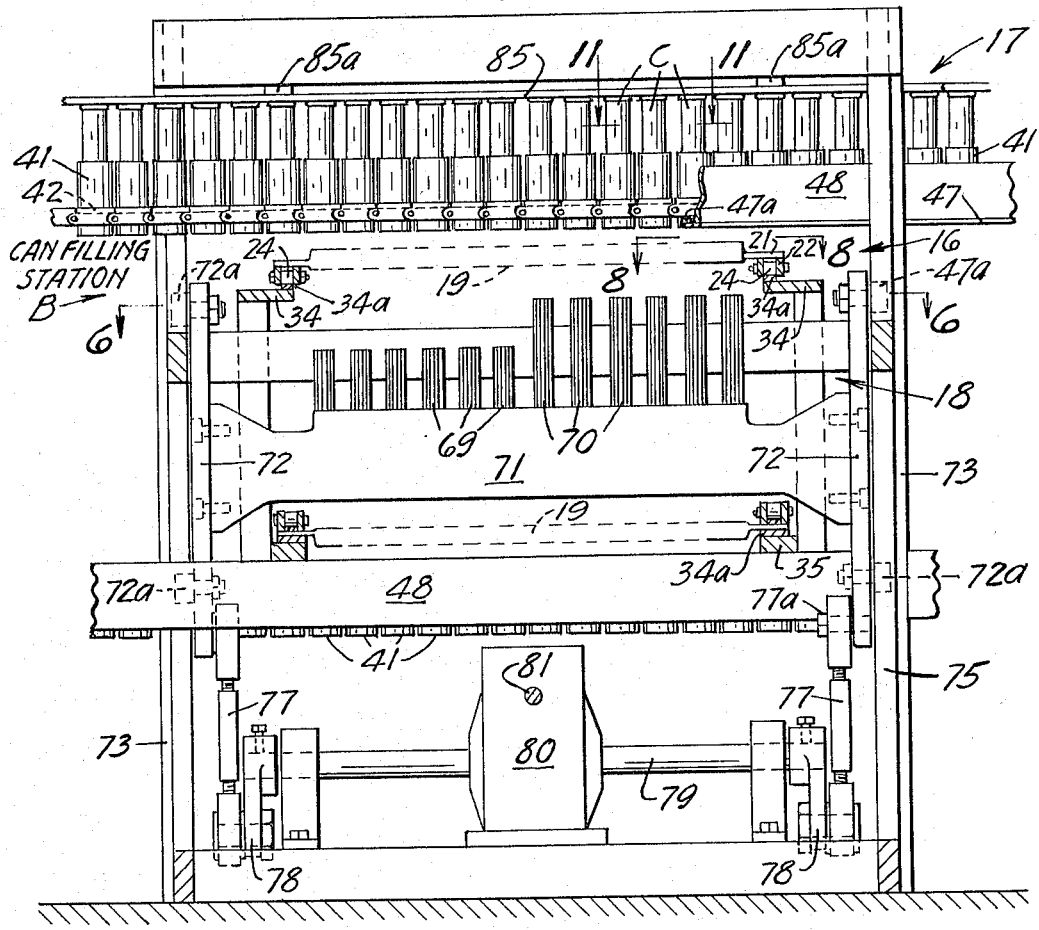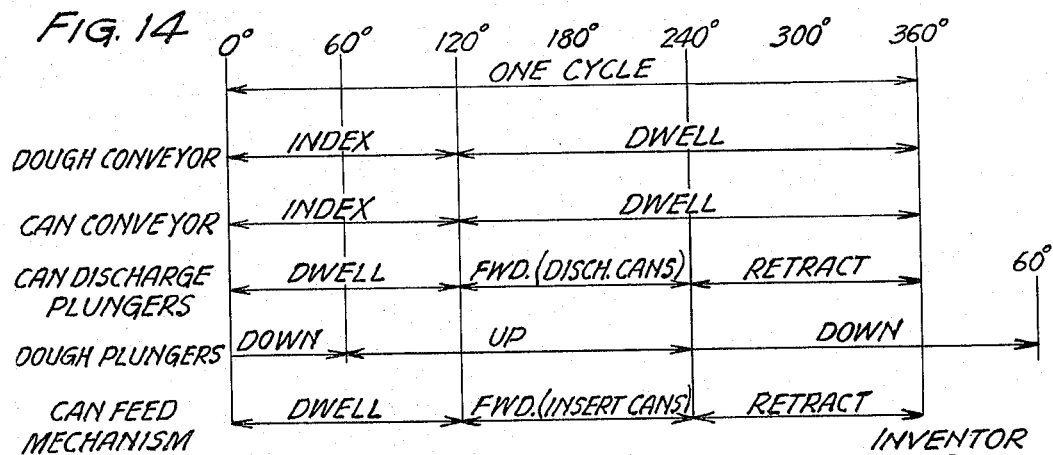

Oct. 18, 1966 F. R. REID 3,279,927
PACKER
Filed Sept. 23, 1960 5 Sheets-Sheet 4

INVENTOR
FRANCIS R. REID
BY Williamson & Palmatier
ATTORNEYS

Oct. 18, 1966  F. R. REID  3,279,927
PACKER
Filed Sept. 23, 1960  5 Sheets-Sheet 5
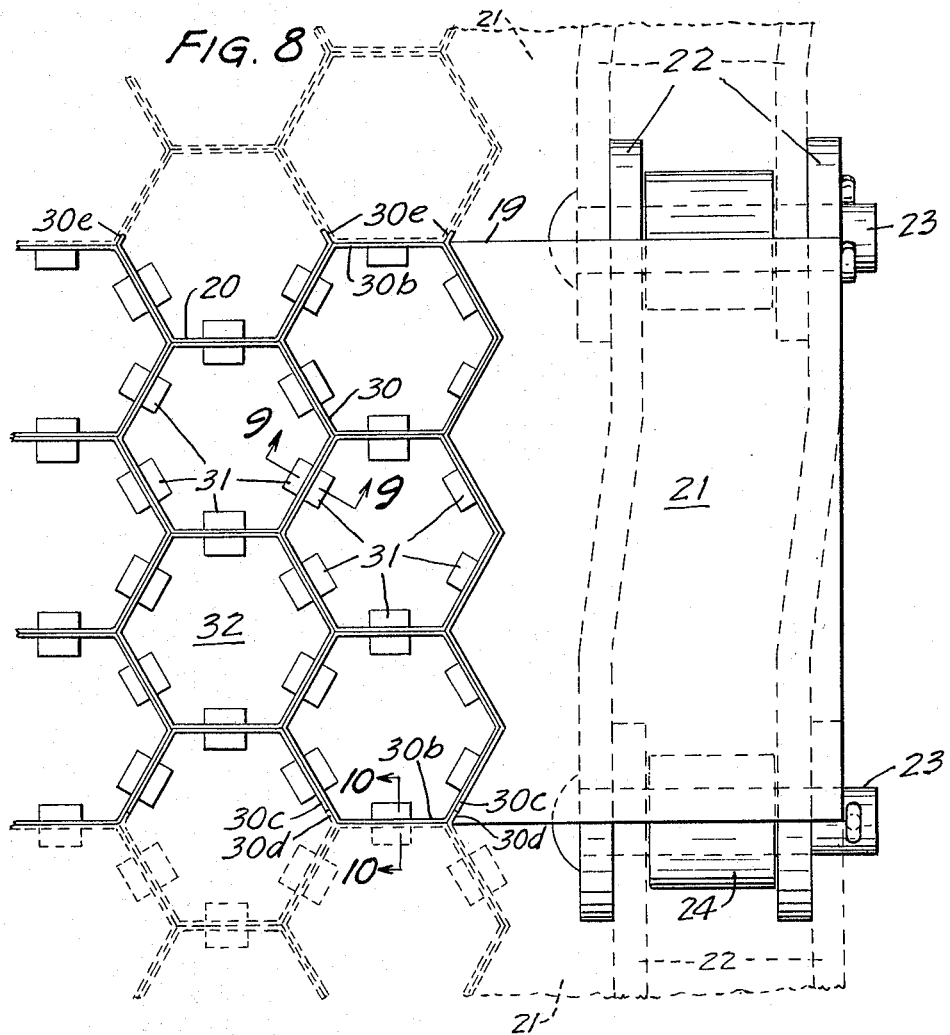
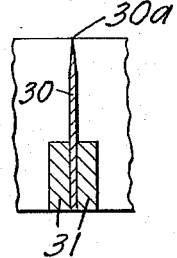
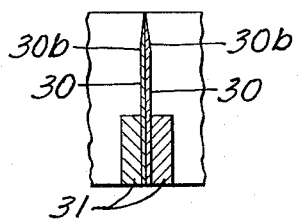
INVENTOR
FRANCIS R. REID
BY
Williamson & Palmatier
ATTORNEYS United States Patent Office 3,279,927
Patented Oct. 18, 1966

3,279,927
PACKER
Francis R. Reid, Louisville, Ky., assignor to The Pillsbury Company, Minneapolis, Minn., a corporation of Delaware
Filed Sept. 23, 1960, Ser. No. 58,018
18 Claims. (Cl. 99—172)

This invention relates to dough handling apparatus and more particularly relates to a machine for forming dough wafers and packing the wafers in cans.

Although dough wafer forming and packing machines have been known in the past, such machines have had numerous disadvantages. One of such important disadvantages is that certain dough, which is essentially of laminate form, tends to delaminate in the cutting of dough wafers in the manipulation of the wafers in packaging. As a result, the control over the detached parts of the dough is lost, and these detached parts will fall and turn and produce any of a number of various types of malfunctions in the packaging operation.

Another of the distinct disadvantages of known dough piece forming and packing machines is that difficulty is encountered in properly controlling the cans and making sure that they are at the precise position necessary for proper filling. It will be understood that when the cans are being filled, the bottom covers are on the cans, and because of the peripheral bead of the bottom cover which protrudes slightly beyond the outer surface of the can sidewall, the cans which sit in an upright position as is necessary in known machines, are not adequately supported against wobbling and tilting.

It has also been difficult in such known machines to form and package, without excessive maintenance, dough pieces which are coated on top with sticky types of icings.

With these comments in mind, it is to the elimination of these and other disadvantages that my invention is directed, along with other novel and desirable features.

An object of my invention is to provide a new and improved dough wafer forming and packing machine of relatively simple and inexpensive construction and operation.

Another object of my invention is to provide a novel machine for handling and packing wafers of generally laminated type dough and preventing delamination of the dough during manipulation of the wafers.

Still another object of my invention is the provision of an improved and novel apparatus for readily and easily packing dough wafers into containers in such a manner that the presence of various icings or special coating agents on the wafers will not affect the operation of the apparatus.

A further object of my invention is to provide an improved apparatus for packing dough wafers into cans which are accurately and positively controlled so as to properly position the cans at the precise location desired during the filling operation.

A still further object of my invention is the provision of a new and novel apparatus for forming from a blanket of dough, a maximum number of dough wafers and packing said dough wafers into cans with a minimum of tearing or mutilation of the dough and a minimum of reworking of the dough.

These and other objects and advantages of my invention will more fully appear from the following description, made in connection with the accompanying drawings, wherein like reference characters refer to the same or similar parts throughout the several views and in which:

FIG. 3 is a detail section view taken approximately at 3—3 in FIG. 1 and having certain of the apparatus in the background deleted;

FIG. 6 is a detail section view taken approximately at 6—6 in FIG. 3;

FIG. 8 is an enlarged detail view taken approximately at 8—8 of FIG. 3;

FIG. 9 is a detail section view taken approximately at 9—9 in FIG. 8;

FIG. 10 is a detail section view taken at 10—10 in FIG. 8;

FIG. 14 is a diagrammatic sketch showing the operational phase relationships of the various portions of the machine.

Figure 1:
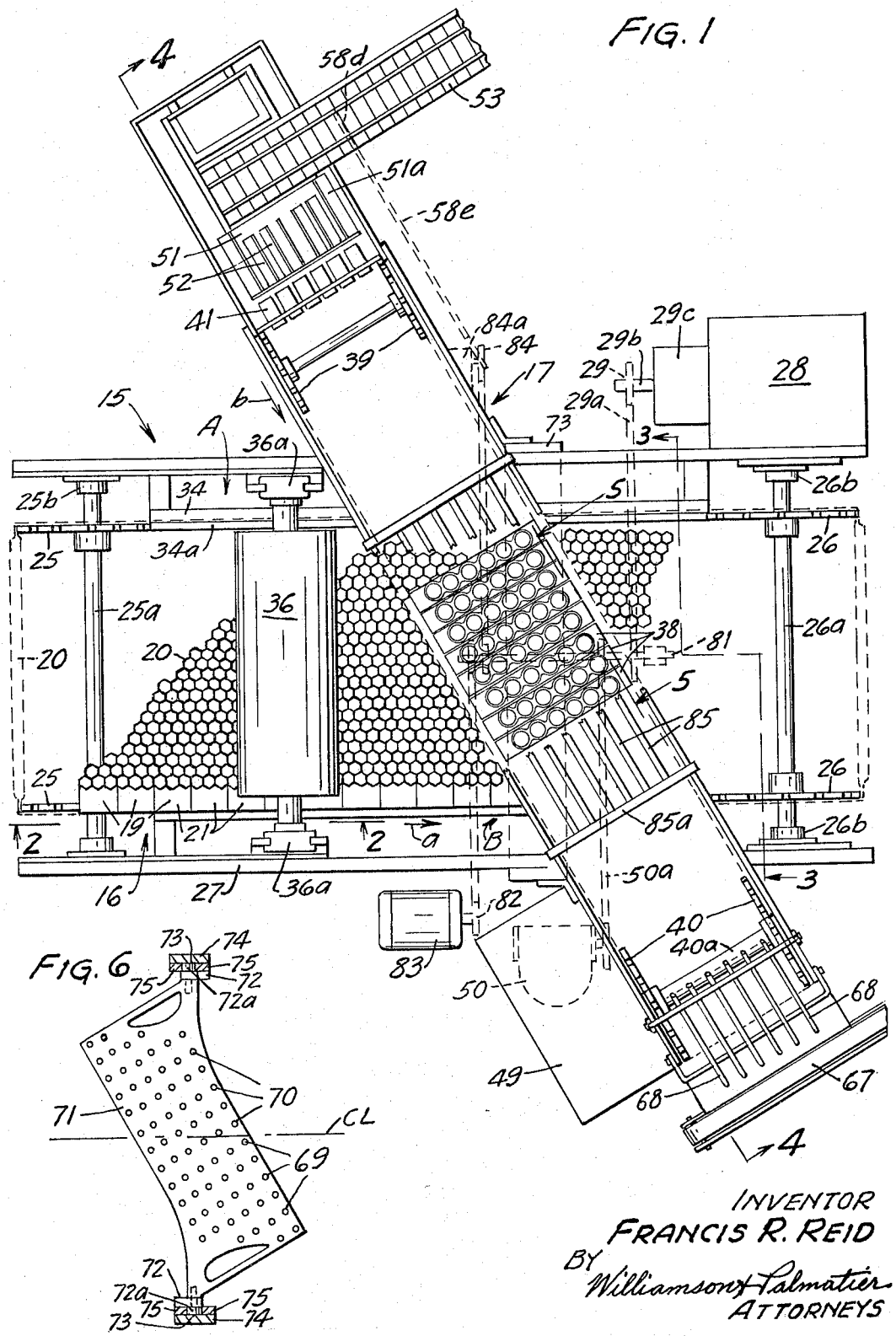
FIG. 1 is a top plan view of the machine and having certain parts broken away for clarity of detail.
Figure 2:
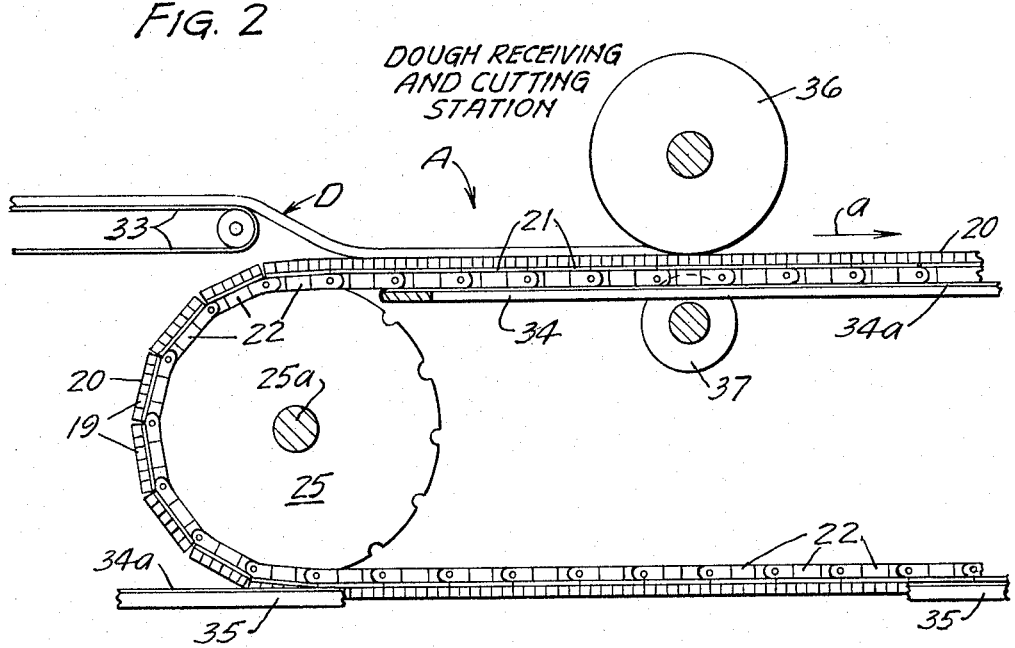
FIG. 2 is a detail section view taken substantially at 2—2 in FIG. 1.
Figure 4:
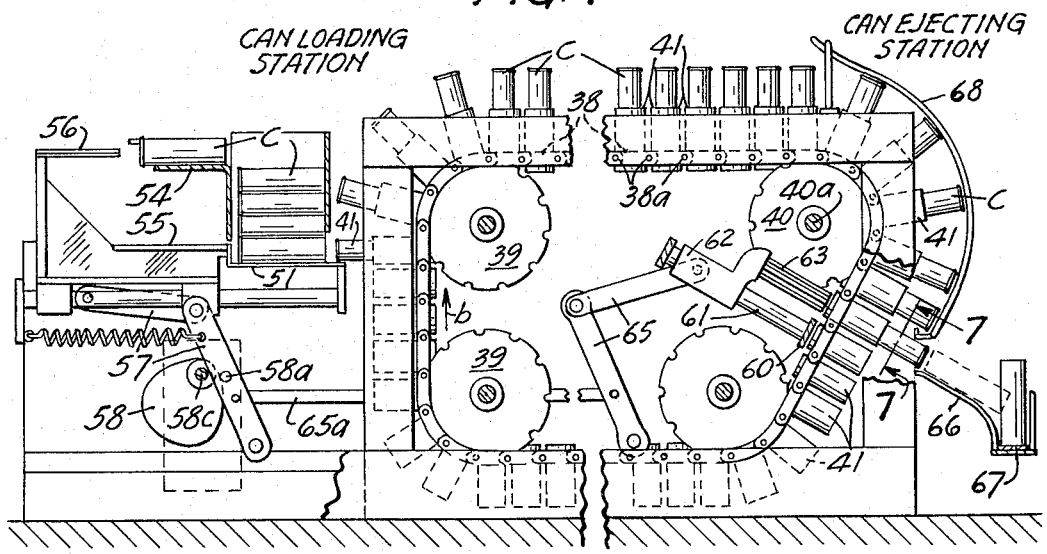
FIG. 4 is a detail section view taken approximately at 4—4 in FIG. 1 and having portions broken away for clarity of detail.

The dough wafer-forming and packing machine is indicated in general by numeral 15 and includes a dough-carrying and cutting mechanism 16 and a can-holding and conveying mechanism 17, and a can-filling mechanism 18.

The mechanism 16 includes a plurality of elongate cutter units 19, each of which has a gridwork 20 defining a plurality of hexagonally shaped dough-receiving openings and mounting plates 21 at the opposite ends of the gridwork, each of which has a pair of underlying bars 22 which are apertured at their ends and which fit in side-by-side relation with corresponding bars 22 of the next adjacent unit and are secured thereto by means of pins 23 which also carry rollers 24. In this manner, each of the cutter units is connected in contiguous but pivotal relation with the next adjacent cutter unit to form an elongate and continuous cutter belt which is trained around idler sprockets 25 and drive sprockets 26 at the opposite ends of the frame 27. Sprockets 25 are fixed to a shaft 25a which is journaled in bearings 25b on the frame 27. The sprockets 26 are fixed to shaft 26a which is supported in bearings 26b on the frame 27, and the end of shaft 26a is driven by a transmission mechanism 28 which produces intermittent rotary movement of the sprockets 26 and cutter units 19 and is driven by power received through sprocket 29, chain 29a, shaft 29b, and a speed reducer 29c.

As is particularly evident in FIG. 8, the gridwork 20 is formed of a plurality of upright plates 30 each forming the contiguous sides of adjacent hexagonal openings 32 and defining, together with the other plates 30 around the periphery of the hexagonal openings, a cutter having a continuous cutting edge 30a. It will be seen that the gridwork defines cutters which are arranged in lines extending longitudinally of the direction of movement indicated by arrow a and which are also arranged in transverse rows extending obliquely of the direction of movement. In alternate lines of cutters or openings of the gridwork 20, the endwise facing plates 30b are of reduced thickness as compared to the other plates 30. Adjacent one of the endwise facing plates 30b, the convergent plates 30c are all of reduced thickness or are recessed at 30d to receive an interfit with the divergent extending tabs 30e which extend obliquely outwardly from the endmost plate 30b at the other side of the unit 19. By means of tabs 30e and recesses 30d, the cutter units 19 are all maintained in precise alignment with each other and each of the hexagonal openings is bounded by a continuous hexagonal cutting edge to completely sever dough which is pressed downwardly into the openings.

Each of the plates 30 is provided with a pair of ledge-defining lugs 31 rigidly affixed thereto and spaced downwardly from the cutting edge 30a for receiving and supporting dough wafers and preventing the wafers from falling through the hexagonal openings 32.

The cutter units are supported as they travel between the sprockets by upper and lower supporting plates 34 and 35 respectively which are suitably provided with nylon bearing strips 34a.

Suitable means such as a conveyor 33 supplies a blanket of dough D onto the cutter units 19 at the dough-receiving and cutting station indicated by letter A.

A dough-pressing roller 36 is also provided at station A and is journalled in suitable bearings 36a on the frame 27 and the periphery of the roller 36 engages the top cutting edges 30a of the cutter plates for pressing the blanket of dough D into the several openings 32. A supporting roller 37 is journalled on bearings supported on the frame and the periphery of the roller 37 engages and supports the cutter units beneath the roller 36.

Figure 5:
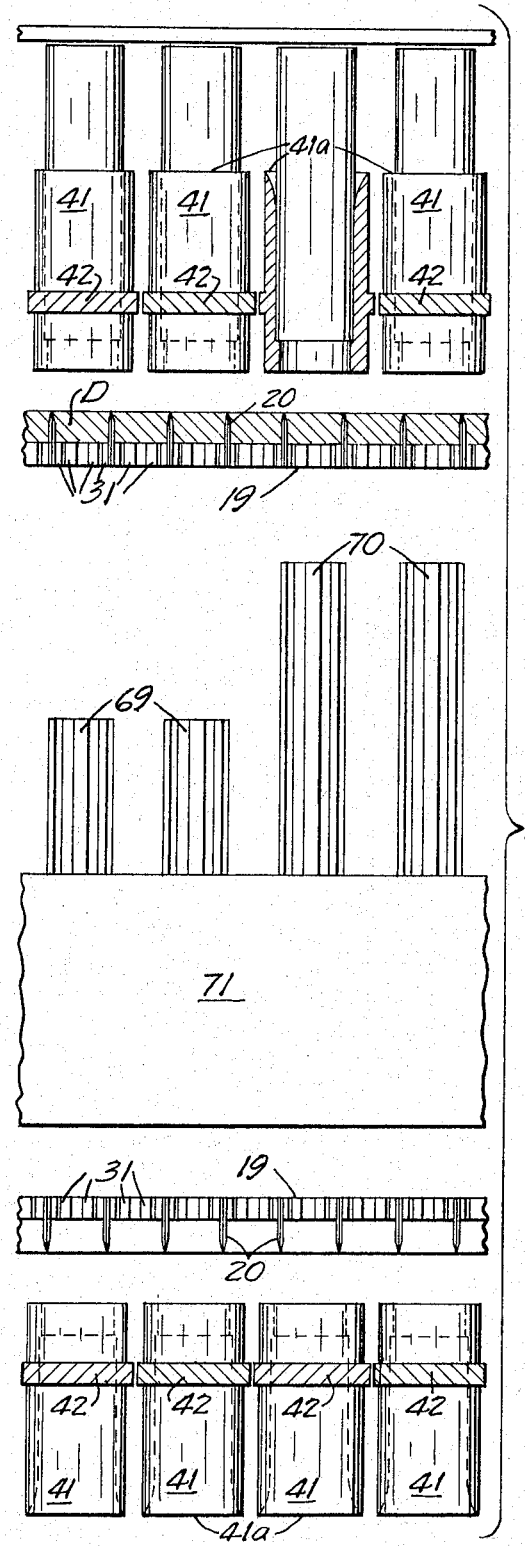
FIG. 5 is an enlarged detail section view taken approximately at 5—5 in FIG. 1.

The mechanism 17 includes a plurality of elongate and rigid can-holding units 38 which are disposed in side-by-side relation with each other and are each pivotally interconnected by pins 38a to form a continuous can-carrying conveyor which is trained around idler sprockets 39 and drive sprockets 40. The upper run or leg of the can-carrying conveyor overlies the upper run or leg of the dough cutters and the lower return run of the can-carrying conveyor underlies the return run of the cutters as clearly shown in FIGS. 3 and 5.

Each of the can-carrying units 38 includes a plurality of side-by-side upright and hollow sleeves 41 which join each other and are cast as an integral multi-sleeve unit, and which are also surrounded by and formed integrally with a plate-like member 42 for connecting with the next adjacent cutter units. The inner periphery of each of the sleeves 41 is provided with a ledge 43 spaced inwardly from the upper can-receiving end 41a in order to prevent the peripheral end edges of the cans from moving downwardly through the sleeves beyond the ledge 43. Each of the sleeves 41 is also provided with a plurality of elongate grooves 44 extending longitudinally therethrough. Each of the sleeves is further provided with a plurality of lower and upper wafer supports 45 and 46 respectively which are constructed of strip-type, resiliently flexible material and which are spaced inwardly from the sleeve periphery so as to be movable in an outward direction toward the sleeve periphery. The wafer supports 45 and 46 are also provided with elongate resiliently flexible depending mounting shanks 45a and 46a respectively which extend obliquely downwardly and outwardly toward the sleeve periphery and are affixed by suitable means such as by counter-sunk rivets to the sleeve at a position below the ledge 43. It will be noted that the can-receiving end 41a of the inner sleeve periphery is flared upwardly and outwardly to facilitate easy entrance of a can into the sleeve.

It will be seen that the can-mounting sleeves 41 will be moved in the direction of arrow b and along the obliquely oriented rows of dough cutters, and each of the can-carrying sleeves 41 is spaced from the corresponding sleeves in the next adjacent units 38 by a distance equal to the spacing between adjacent but non-contiguous hexagonal cutters of the units 19, and the sleeves 41 in each of the units 38 are spaced from each other a distance equal to the spacing between a pair of adjacent but non-contiguous cutters.

The can-conveying units 38 are supported between the sprockets by supporting bars 47 and nylon wear strips 47a and the bars 47 are affixed to the elongate guide frames 48 which are rigid with the frame 27.

The sprocket 40 is affixed to a drive shaft 40a which is connected into a transmission mechanism 49 which produces intermittent motion on the sprockets 40 and can-carrying units 38. The transmission 49 is driven through a speed reducing mechanism 50 from a chain 50a.

Means are provided for loading the cans into the sleeves 41 and in the form shown, such means includes a can support 51 disposed adjacent the upwardly moving leg of the can conveyor and having sidewalls 51a on the edges thereof to confine the cans C in a plurality of rows wherein the cans are spaced by means of vanes 52 to the positions corresponding to the spacing between adjacent sleeves in the units 38. Cans C are supplied down a chute 53 onto a ledge 54, which is above and adjacent the support 51. The bottom row of cans C is pushed into the adjacent unit 38 by means of a pusher 55 which has an upper arm 56 which pushes the cans from the ledge 54 into the space above the support 51 by means of a linkage 57 which is driven by a rotary cam 58 bearing against the cam follower 58a on the linkage. The pusher 55 may comprise a plurality of upright plates reciprocating through suitably provided slots in the plate 51. The cam is driven by a roller chain 58e.

Figure 7:
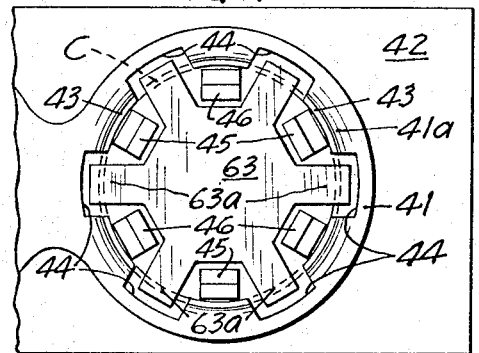
FIG. 7 is an enlarged detail view taken approximately at 7—7 of FIG. 4.

Means are also provided for ejecting the cans from the units 38 and in the form shown a pair of rigid frame members 60 mount a guide bar 61 adjacent the downwardly traveling leg of can-carrying units 38 wherein the sleeves are tipped in a downwardly oblique position. A bearing sleeve 62 is movable on the guide 61 and carries a plurality of can-ejecting plungers 63 which are externally ribbed as is seen in FIG. 7 at 63a to be received in the grooves 44 of the sleeves for engaging the peripheral end edge of the can sidewalls and ejecting the cans from the sleeves as the pistons 63 pass therethrough. The sleeves 62 connect with a linkage 65 which is in turn connected by a link 65a to the linkage 57 to be moved simultaneously therewith. Can-receiving plate 66 adjacent the ejector plungers receives the cans as they move out of the sleeves and may direct the cans onto a suitable conveyor 67 for delivering the cans away from the mechanism. It will be noted that adjacent the can-ejecting or unloading station a plurality of stationary can-retaining guide bars 68 are positioned in confronting relation with the outer ends of the sleeves and spaced therefrom in order to retain and guide the cans as they move with the sleeves into tipped position and downwardly along the downwardly traveling leg of the can conveyor.

At the can-filling station indicated in general by letter B, the cans pass over the dough cutters with the open lower ends of the cans and the open lower ends of the sleeves 41 disposed in confronting relation with the dough pieces of the dough cutters. A plurality of plungers 69 and 70 are arranged in upstanding position and are carried on a suitable mounting plate 71 which, at its opposite corners, is provided with upstanding guide bars 72 having rollers 72a adjacent the upper and lower ends thereof and moving in a vertically oriented guideway 73 which is defined by the upright frame member 74 and side pieces 75 and is rigidly affixed to the frame 27. It will be noted that the plungers 69 and 70 are arranged on the frame plate in a plurality of longitudinally extending lines and transversely extending rows, and it should be noted that all of the plungers 69 on one side of the center line CL are short and all of the plungers 70 on the other side of the center line are long as hereinafter more fully pointed out. The lower ends of the guide bars 72 are interconnected by means of a shaft 76 and a pair of links 77 are rotatably connected by bearings 77a to the shaft for vertically reciprocating the plungers 69 and 70 and the mounting plate 71. The lower ends of the links 77 are rotatably connected to crank arm 78 which are fixed to a shaft 79 to which rotary power is applied by a transmission mechanism 80 which is in turn driven by shaft 81 running longitudinally of the framework and powered by a chain and sprocket 82 and motor 83. The shaft 81 is also connected by means of a chain and sprocket 84, a speed reducer transmission mechanism 84a and chain 58e to the cam 58.

Figure 11:
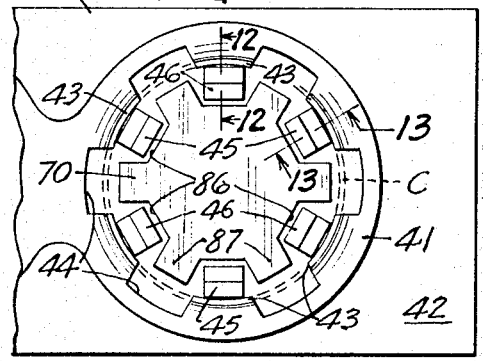
FIG. 11 is an enlarged detail view taken approximately at 11—11 of FIG. 3, but having the cans removed for clarity of detail.
Figures 12, 13:
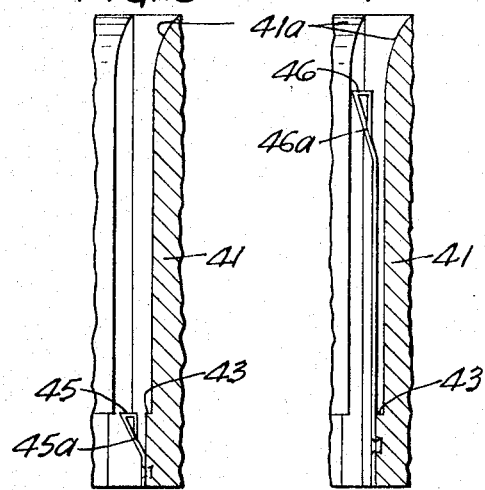
FIG. 12 is a detail section view taken at 12—12 in FIG. 11.
FIG. 13 is a detail section view taken at 13—13 in FIG. 11.

As is clearly shown in FIG. 11, each of the plungers 69 and 70 has a plurality of grooves 86 extending longitudinally therethrough and a corresponding plurality of longitudinally extending ribs 87. It will be noted that the grooves 86 are aligned with the wafer supports 45 and 46 when the can-carrying units 38 are stopped at the can-filling station. The ribs 87 are aligned with the spaces between the wafer supports for supporting the edges of the dough wafers.

It will further be noted that a plurality of bars 85 extend longitudinally along and above the can conveyor at the can-filling station B, and together with the end frames 85a thereof, define a can-hold-down member to prevent the cans from being uplifted in the sleeves as the wafers and plungers move upwardly therein.

Operation

In relation to the operation, attention is invited to FIG. 14 which shows diagrammatically the simultaneous sequence of operation of the several components of the machine. At the outset it should be pointed out that the motor 83, together with the speed reducing mechanism 29c and intermittent drive transmission apparatus 28 produces an intermittent movement of the cutter units 19 such that each time the cutter units are moved, they move a distance equal to three times the width of a single hexagonal opening measured on a line along the path of movement. Assuming that an operational cycle commences with the initial movement of the cutter units on the dough conveyor, the cutter units 19 are in movement for one-third of the cycle and are stationary for the second two-thirds of the cycle.

Likewise, the can-conveying units are moving for the first one-third of the operational cycle and are stationary for the second two-thirds of the cycle. The motor, together with the speed reducing mechanism 50 and the intermittent drive transmission 49 produces the intermittent movement of the can-carrying units 38, and each time the can-carrying units 38 are moved they are moved through a distance equal to twice the width of a hexagonal opening as measured along a row extending obliquely transversely of the path of movement of the cutter units 19, i.e., along the path of movement of the can-carrying units 38.

Because the can-loading pushers 55 and the can-ejecting plungers 63 are mechanically linked together, they move simultaneously. The motor 83, together with the transmission mechanism 85 and the rotary cam 58 cause the pushers 55 and discharge plungers 63 to remain stationary during the first one-third of the operational cycle, and cause the pushers 58 and plungers 63 to reciprocate once during the second two-thirds of the operating cycle for respectively loading empty cans into the sleeves and for ejecting filled cans.

The motor 83 together with the transmission mechanism 80 and the interconnecting linkages to the plungers 69 and 70 produce continuous vertical reciprocation of the plungers 69 and 70. Although the plungers do not remain stationary for any extended period of time, they are timed or synchronized in their movement so that the plungers are completely withdrawn from the hexagonal openings 32 of the cutter units 19 each time the cutter units are moved. In FIG. 14 it will be seen that the plungers 69 and 70 are moving downwardly at the assumed beginning of the operational cycle, and commence their upward movement at the end of sixty degrees of the operational cycle, and commence their downward movement at the beginning of the final one-third of the operational cycle.

More specifically, it will be noted that each time the plungers 69 and 70 are moved upwardly, a hexagonal opening of the cutter units having a wafer therein, is vertically aligned with each of the plungers. The plungers 69 move upwardly into the sleeves 41 so that the upper ends of the plungers are disposed at or slightly above the level of the ledge 43 and the wafer supports 45. During the upward movement of the wafers on the plungers 69, the wafers engage the shank portion 45a and cam the wafer supports outwardly until the wafers pass by the wafer supports, whereupon the wafer supports 45 are resiliently moved inwardly of the sleeve again and into the grooves of the plungers, whereupon when the plungers 69 move downwardly again, the wafer supports will retain the dough wafers thereon. The reciprocation of the elongate plungers 70 is substantially identical to that described in connection with plungers 69 with the exception that the plungers 70 move the wafers past the wafer supports 45 and then upwardly onto the wafer supports 46 whereupon the supports 46 retain the wafer delivered thereto at a position approximately midway of the length of the can C. As the units 38 and cans C travel through the filling station B, the cans C are held downwardly in the sleeves 41 by the bars 85.

It should be noted that as the can-carrying sleeves progressively move from one position to another, each sleeve is, in a successive operational cycle, successively vertically aligned with each of six elongate plungers 70, whereupon six dough wafers are supplied into the can, one below the other, and as successive wafers are supplied the other wafers already in the can are merely lifted upwardly. Likewise, as each sleeve 41 progressively moves further, it is, in the subsequent successive operational cycle, aligned with each of six of the short plungers 69, whereupon six additional dough wafers are supplied into the can and onto the wafer supports 45. While the last mentioned six additional dough wafers are being supplied into the can, the first six wafers are merely supported on the wafer supports 46. At the filling station B, the dough wafers are removed from all of the hexagonal openings of cutter units 19, after which the cutter units pass around the sprockets 26 and back to the dough-receiving and cutting station A again.

The cutter units again receive dough which is cut and presented to additional cans progressively moving along the can conveyor. The packing operation is continuous with each sleeve and can therein receiving a dough wafer during each operational cycle and during each vertical reciprocation of the plungers.

When the cans have received the necessary number of dough wafers, they are moved progressively toward the can ejecting station and will move around the uppermost sprockets 40 and be retained by the bars 68 as the cans tip to a position wherein the closed ends face generally downwardly. Subsequently, the can- ejecting plungers 63 move through the sleeves with the ribs 63a thereof moving through the grooves 44 of the sleeves so that the ribs 63a engage the peripheral end edges of the can sidewalls, and the central portion of the plungers 63 may engage the dough wafer at the open end of the can. As the cans are pushed from the sleeves, the wafer supports 45 and 46 are withdrawn and of course remain with the sleeves 41. The can-carrying units 38 then progressively move around the continuous path to the can loading station.

It will, of course, be understood that various changes may be made in the form, details, arrangement and proportions of the parts without departing from the scope of my invention which consists of the matter shown and described herein and set forth in the appended claims.

What I claim is:

1. A machine for packing dough wafers into cans each of which has an open end and a closed end, comprising a plurality of upright can-holding sleeves rigidly inter-connected and having upper ends to receive and hold the open ends of the cans and also having inwardly protruding ledge means below said upper ends to engage and support the peripheral edge of the can sidewall at the open end, a plurality of wafer supports in each sleeve and spaced inwardly from the inner periphery adjacent said ledge means, means movably mounting said supports and permitting outward movement thereof toward the sleeve inner periphery and including elongate support-moving cams depending from said supports and extending obliquely downwardly and outwardly therefrom to be cammed outwardly by upward movement of a dough wafer therealong, means mounting and moving said sleeves between a first can-loading station and a second can-filling station, a plurality of upstanding plungers below the sleeves and in alignment therewith at said second station, means supplying dough wafers above and in alignment with the plungers, and means vertically reciprocating said plungers and moving said plungers upwardly into said sleeves and above said supports to carry the wafers into the cans and onto said supports.

2. The invention set forth in claim 1 and said plungers having upright slots in the periphery thereof and through the upper end thereof in alignment with said cams and supports to permit the supports to move under the wafers for retaining and supporting the wafers when the plungers are moved downwardly.

3. A machine for packing dough wafers into cans each of which has an open end and a closed end, comprising a plurality of upright can-holding sleeves rigidly inter-connected and having outer ends to receive and hold the open ends of the cans and also having inner ends, said sleeves also having radially inwardly protruding ledge means below said upper ends to engage and support the peripheral edge of the can sidewall at its open end, a plurality of wafer supports in each sleeve and spaced inwardly from the inner sleeve periphery adjacent said ledge means, each of said supports having an elongate resiliently flexible shank extending obliquely downwardly and outwardly toward the inner periphery of the sleeve, means affixing said shank to the sleeve and below said ledge means, means mounting and moving said sleeves between a first can-loading station and a second can-filling station, a plurality of upstanding plungers below the sleeves and in alignment therewith at said second station, means supplying dough wafers above and in alignment with the plungers, and means vertically reciprocating said plungers upwardly to lift the wafers into said sleeves and against said shanks to cam the supports outwardly and then above the supports to cause the wafers to be retained and supported by the supports.

4. The invention set forth in claim 3 and said sleeve mounting and moving means also moving said sleeves beyond said second station to a third can-unloading station, said sleeves having inwardly facing and longitudinally extending grooves disposed between said wafer supports, a plurality of can-ejecting plungers confronting the inner ends of said sleeves at said third station, said can-ejecting plungers having longitudinally extending ribs and grooves on the periphery thereof and having dough-engaging end surfaces, said plunger ribs being aligned with the grooves of the sleeves at the third station for engaging the edge of the can, and said plunger grooves being aligned with the corresponding wafer supports therein, and means reciprocating said can-ejecting plungers into and out of said sleeves for pushing the cans and dough wafers out of the sleeves.

5. A machine for packing dough wafers into cans each of which has an open end and a closed end, comprising a plurality of upright can-holding sleeves rigidly inter-connected and having upper ends to receive the open ends of the cans and to hold the sidewalls thereof and also having inwardly protruding ledge means below said upper ends to engage and support the peripheral edge of the can sidewall at the open end, a plurality of first and second wafer supports in each sleeve and spaced inwardly from the inner sleeve periphery, each of said supports having an elongate, resiliently flexible shank extending obliquely downwardly and outwardly to be cammed outwardly by upward movement of a dough wafer therealong, means affixing said shanks to the sleeves below said ledge means, said second wafer supports being disposed adjacent said ledge means, said first wafer supports being disposed in spaced relation above said ledge means to extend into the can, means mounting and intermittently and progressively moving said sleeves from a first can-loading station to first and second positions of a second can-filling station, a plurality of first and second upstanding plungers below the sleeves and respectively disposed at said first and second positions of the second station and in alignment with the sleeves when stopped, means supplying dough wafers above and in alignment with said plungers, and means vertically reciprocating said first plungers upwardly to said first wafer supports and reciprocating said second plungers to said second wafer supports to cause the wafers to be retained and supported by the respective wafer supports.

6. The invention set forth in claim 5 and including means rigidly interconnecting said plungers with each other, said first plungers exceeding the length of said second plungers by a distance substantially equal to the vertical spacing between said first and second wafer supports.

7. A machine for packing dough wafers into cans each of which has an open end and a closed end, comprising a plurality of upright can-holding sleeves rigidly interconnected and having upper ends to receive the open ends of the cans and to hold the sidewalls thereof and also having inwardly protruding ledge means below said upper ends to engage and support the peripheral edge of the can sidewall at the open end, a plurality of first and second wafer supports in each sleeve and spaced inwardly from the inner sleeve periphery, each of said supports having an elongate, resiliently flexible shank extending obliquely downwardly and outwardly to be cammed outwardly by upward movement of a dough wafer therealong, means affixing said shanks to the sleeves below said ledge means, said second wafer supports being disposed adjacent said ledge means, said first wafer supports being disposed in spaced relation above said ledge means to extend into the can, means mounting and progressively and intermittently moving said sleeves from a first can-loading station to a plurality of first positions and a plurality of second positions of a second can-filling station, a plurality of first and second plungers below the sleeves and respectively disposed at said first and second positions of the second station and in alignment with the sleeves when stopped, means supplying dough wafers above and in alignment with the plungers, and means vertically reciprocating said first plungers upwardly to the first wafer supports and reciprocating said second plungers upwardly to said second wafer supports to progressively supply a plurality of wafers onto and above said first wafer supports and to supply a plurality of wafers onto and above said second wafer supports and into the cans.

8. A machine for packing dough wafers into cans, each of which has an open end and a closed end, comprising a plurality of upright can-holding sleeves rigidly interconnected and having upper ends to receive the open ends of the cans and also having inwardly protruding ledge means below said upper ends to engage and support the peripheral edge of the can sidewall at the open end, a plurality of wafer supports in each sleeve and spaced inwardly from the inner periphery adjacent said ledge means, said wafer supports having elongate resiliently flexible shanks extending obliquely downwardly and outwardly to be cammed outwardly by upward movement of a dough wafer therealong, means affixing said shanks to the sleeves below said ledge means, means mounting and progressively moving said sleeves from a first can-loading station to a plurality of positions at a second can-filling station, a plurality of upstanding plungers below said sleeves and in alignment therewith at said several positions of said second station, means supplying dough wafers above and in alignment with the plungers, and means vertically reciprocating said plungers upwardly into the sleeves and above said wafer supports for successively carrying a plurality of wafers upwardly through each sleeve and onto and above the wafer supports, and a stationary and rigid can-holding-down member spaced above and confronting the upper ends of said sleeves at said second station for preventing the cans from being lifted or otherwise removed from the sleeves.

9. Apparatus for holding and moving cans of the type having one open end and one closed end, comprising a plurality of elongate and rigid can-carrying units arranged in side-by-side relation and having means pivotally interconnecting the side-by-side units to define a continuous can-carrying assembly, means mounting and moving said assembly around a continuous path and past a can-filling station, each of said units including a plurality of aligned can-mounting sleeves opening in both endwise directions and having first can-receiving ends for snugly receiving the can sidewall with the open end of the can extending into the sleeve, and each of said sleeves also having a second end through which the can may be filled and each of said sleeves also having inwardly protruding ledge means between the ends of the sleeve for engaging the peripheral end edge of the can sidewall, and a rigid retaining member extending along the path at said station and disposed in spaced and confronting relation with said first ends of the sleeves for retaining the cans in the sleeves at the station.

10. Apparatus for holding and moving cans of the type having one open end and one closed end, comprising a plurality of elongate and rigid can-carrying units arranged in side-by-side relation and having means pivotally interconnecting the side-by-side units to define a continuous can-carrying assembly, means mounting and moving said assembly around a continuous path having at least one horizontally extending leg and past a can-filling station adjacent one leg, each of said units including a plurality of aligned can-mounting sleeves opening in both endwise directions and said sleeves when oriented in said horizontal leg having first can-receiving upper ends snugly receiving the can sidewall with the open end of the can extending downwardly into the sleeve and each of said sleeves also having a second lower end through which the can may be filled and each of said sleeves also having inwardly protruding ledge means between the ends of the sleeve and engaging the peripheral end edge of the can sidewall, a rigid and stationary retaining member extending along said horizontal leg of the path at said station and disposed in spaced and confronting relation above said upper ends of the sleeves at said station for retaining the cans in the sleeves, obstruction means secured in the sleeves adjacent said ledge means preventing downward movement of the material from the cans and permitting inward movement of such material.

11. The invention set forth in claim 10 wherein said obstruction means includes a plurality of stops spaced inwardly from the sleeve inner periphery and disposed adjacent said ledge means, each of said stops having an elongate resiliently flexible shank extending obliquely downwardly and outwardly to be cammed outwardly by movement of material pieces into the can to be supported upon said stops.

12. The invention set forth in claim 9 and wherein said sleeves have longitudinally extending grooves in the inner periphery thereof, and a plurality of can-ejecting plungers spaced along said path from said station, said plunger having the ends thereof confronting the second ends of said sleeves and having ribs on the periphery thereof aligned with said grooves for engaging the peripheral end edges of the cans, and means for reciprocating said plungers into and out of said sleeves for ejecting the cans therefrom.

13. The invention set forth in claim 10 wherein the continuous path includes a second leg arranged to orient the first ends of the sleeves below the second ends thereof to top the cans with the closed ends thereof facing generally downwardly, said sleeves having longitudinally extending grooves in the inner periphery thereof, and a plurality of can-ejecting plungers adjacent said second leg of the path and having can-engaging ends confronting said second ends of the sleeves, said plungers having a plurality of ribs on the periphery thereof and aligned with said grooves for engaging the peripheral end edges of the can sidewalls.

14. The invention set forth in claim 9 and said continuous path having an upright portion, a can-loading station at said upright portion of the path wherein said sleeves are oriented substantially horizontally, a stationary can support adjacent said loading station and supporting cans in confronting relation with said first ends of the sleeves, means supplying cans onto the support in horizontal position with the open ends thereof facing the sleeves, and a pusher adjacent the support and spaced from the sleeves in confronting relation therewith and means reciprocating the plunger toward and away from the sleeves for moving cans off the support and into the sleeves.

15. A method of filling open ended containers with plastic dough wafers comprising orienting the container in an upright position with the open end facing downwardly, inserting a first stack comprising a plurality of dough wafers into the container to a first position substantially spaced from the open end of the container and supporting said wafers at said first position, subsequently inserting a second stack comprising a plurality of dough wafers into the container to a second position substantially remote from said first position and supporting said second stack of wafers at said second position independently of said first stack.

16. A method of filling open ended containers with plastic dough wafers comprising orienting the container in an upright position with the open end facing downwardly, moving at least one dough wafer into the container to a first position substantially spaced from the open end of the container and supporting said wafer at said first position, successively moving additional dough wafers to said first position in the container thereby forming a first stack of wafers supported at said first position, subsequently moving at least one dough wafer into the container to a second position substantially remote from said first position and supporting said wafer at said second position, successively moving additional dough wafers to said second position thereby forming a second stack of wafers supported at said second position independently of said first stack.

17. In the art of placing a multiplicity of plastic dough wafers in an open-ended can, the method steps consisting in orienting the can in an upright position with the open end facing downwardly, moving a first dough wafer upwardly into the can to a first position substantially spaced above and remote from the open end, individually supporting said wafer at said position, successively moving additional individual dough wafers to said position in the can to uplift said first and additional wafers and to form a stack of wafers above said position, sequentially supporting each of said additional wafers at said first position, moving a second dough wafer upwardly to a second position remote from said first position and adjacent the open end of the can, individually supporting said second wafer at said second position, successively moving other individual dough wafers to said second position in the can to uplift said second and other wafers and to form a stack of wafers above said second position and below said first position, and inverting said can.

18. In a machine for packing sections of dough or the like into containers each having an open end, means supporting said sections, an endless conveyor defining a plurality of transverse ranks of container receiving means, means for transferring said sections from said supporting means to containers carried by said receiving means, a loading station, and means for loading empty containers into said receiving means of a rank at said loading station comprising a container supply, means to deliver containers from said supply into alignment with receiving means of a rank, and means for inserting said aligned containers endwise into said receiving means, said means for inserting said aligned containers into said receiving means comprising plunger means and means for operating said plunger means through strokes of reciprocation.

References Cited by the Examiner

UNITED STATES PATENTS

| | | | |
|---|---|---|---|
| 2,540,945 | 2/1951 | Hart | 53—74 |
| 2,619,051 | 11/1952 | Rice | 83—148 |
| 2,623,479 | 12/1952 | Clinton | 83—148 |
| 2,664,833 | 1/1954 | Armstrong et al. | 53—123 |
| 2,707,922 | 5/1955 | Ferguson et al. | 53—123 X |
| 2,711,275 | 6/1955 | Bartlett | 53—64 |
| 2,941,341 | 6/1960 | Clinton | 53—123 |
| 2,955,393 | 10/1960 | Muller et al. | 53—242 X |

TRAVIS S. McGEHEE, *Primary Examiner.*

ROBERT A. LEIGHEY, FRANK E. BAILEY,
H. C. JONES, W. M. COHEN, *Assistant Examiners.*